United States Patent
Spears

[19]

[11] Patent Number: 6,099,069
[45] Date of Patent: Aug. 8, 2000

[54] DEVICE TO SELECTIVELY CREATE DRAG ON A TRANSPORT VEHICLE FOR SPEED REDUCTION

[76] Inventor: Dan E. Spears, 3515 Westfield Dr., Brandon, Fla. 33511

[21] Appl. No.: 09/082,815

[22] Filed: May 21, 1998

Related U.S. Application Data

[63] Continuation-in-part of application No. 08/873,306, Jun. 11, 1997, Pat. No. 5,876,088, which is a continuation-in-part of application No. 08/659,079, Jun. 3, 1996, Pat. No. 5,653,493, which is a continuation-in-part of application No. 08/351,800, Dec. 8, 1994, Pat. No. 5,522,637, which is a continuation-in-part of application No. 08/351,831, Dec. 8, 1994, Pat. No. 5,536,062, which is a continuation-in-part of application No. 08/352,515, Dec. 9, 1994, Pat. No. 5,595,419.

[51] Int. Cl.[7] .................................................. B62D 35/00
[52] U.S. Cl. ..................... 296/180.2; 296/180.4; 296/180.5
[58] Field of Search ............................. 296/180.1–180.5

[56] References Cited

U.S. PATENT DOCUMENTS

| | | | |
|---|---|---|---|
| 4,693,506 | 9/1987 | Massengill | 296/180.3 |
| 5,340,190 | 8/1994 | Engel | 296/180.5 |
| 5,791,724 | 8/1998 | Wasley | 296/180.2 |

FOREIGN PATENT DOCUMENTS

| | | | |
|---|---|---|---|
| 366616 | 5/1990 | European Pat. Off. | 296/180.2 |
| 3611750 | 10/1987 | Germany | 296/180.1 |
| 1526860 | 10/1978 | United Kingdom | 296/180.5 |

*Primary Examiner*—Dennis H. Pedder

[57] ABSTRACT

Devices, and associative methods, of creating drag on a transport vehicle are disclosed. Drag creation devices are comprised of a slipstream control device and a striking surface device. The slipstream control device attaches to a truck of a transport assembly. The slipstream control device has at least one moveable part which provides for transfer of the slipstream control device between a slipstream streamlining orientation and a slipstream redirecting orientation. The slipstream control device acts upon a slipstream created by movement of the transport assembly during a forward advance along a highway. The striking surface device may be attached to the truck or to a trailer attached to the truck. The striking surface device has an impingement surface which provides for impingement of a portion of the slipstream redirected by the slipstream control device while in the slipstream redirecting orientation. The impingement creates the desired drag upon the transport vehicle. Optionally, the striking surface device may be moveable between a free flow configuration and an impingement configuration.

18 Claims, 8 Drawing Sheets

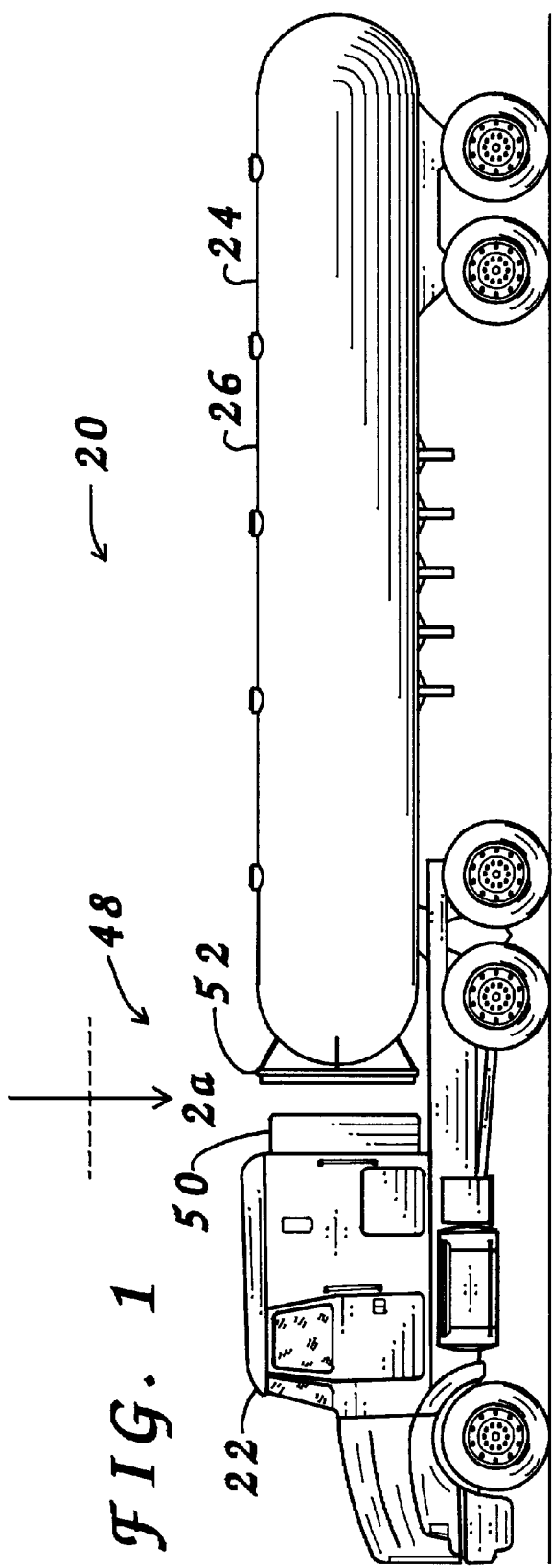

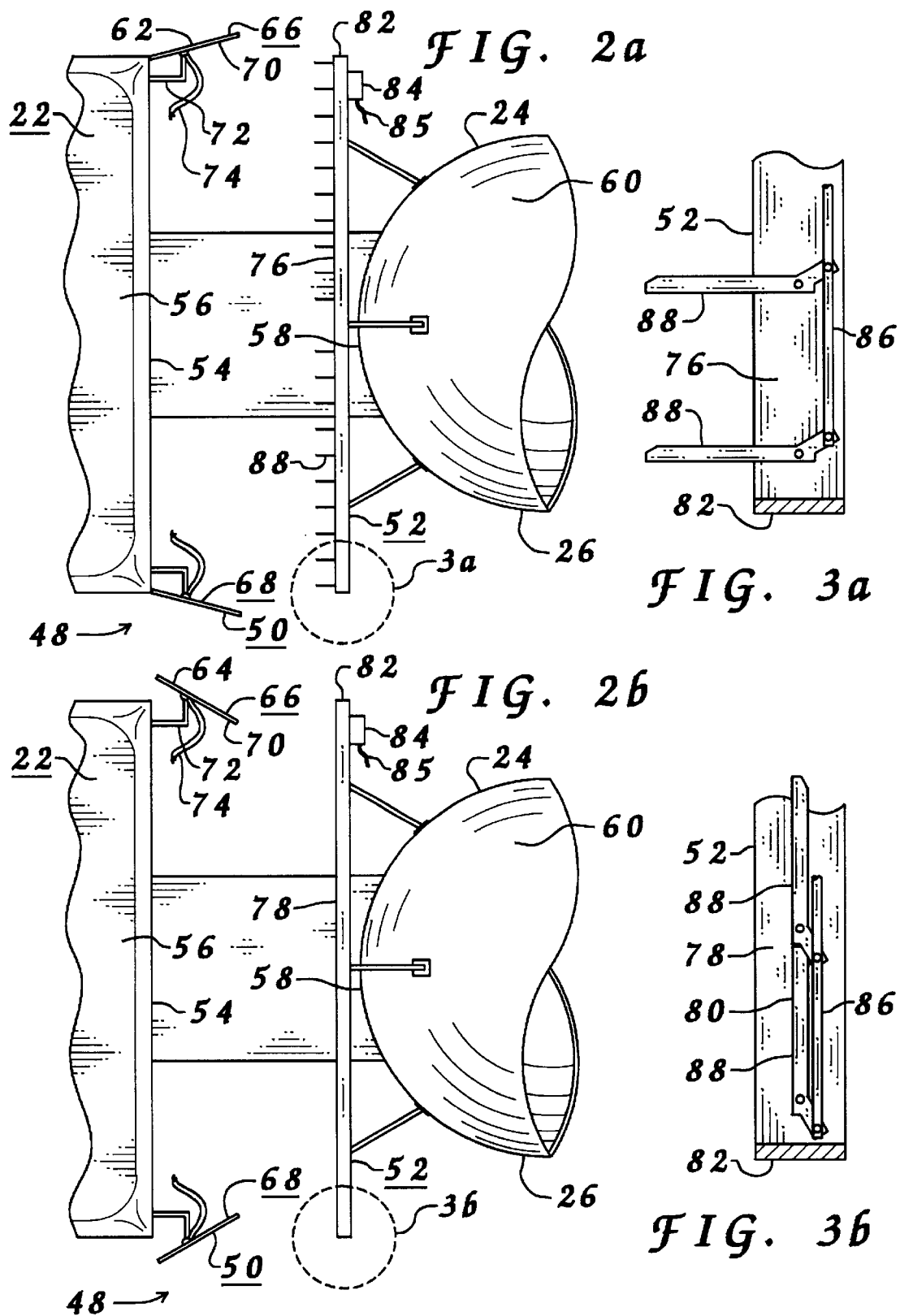

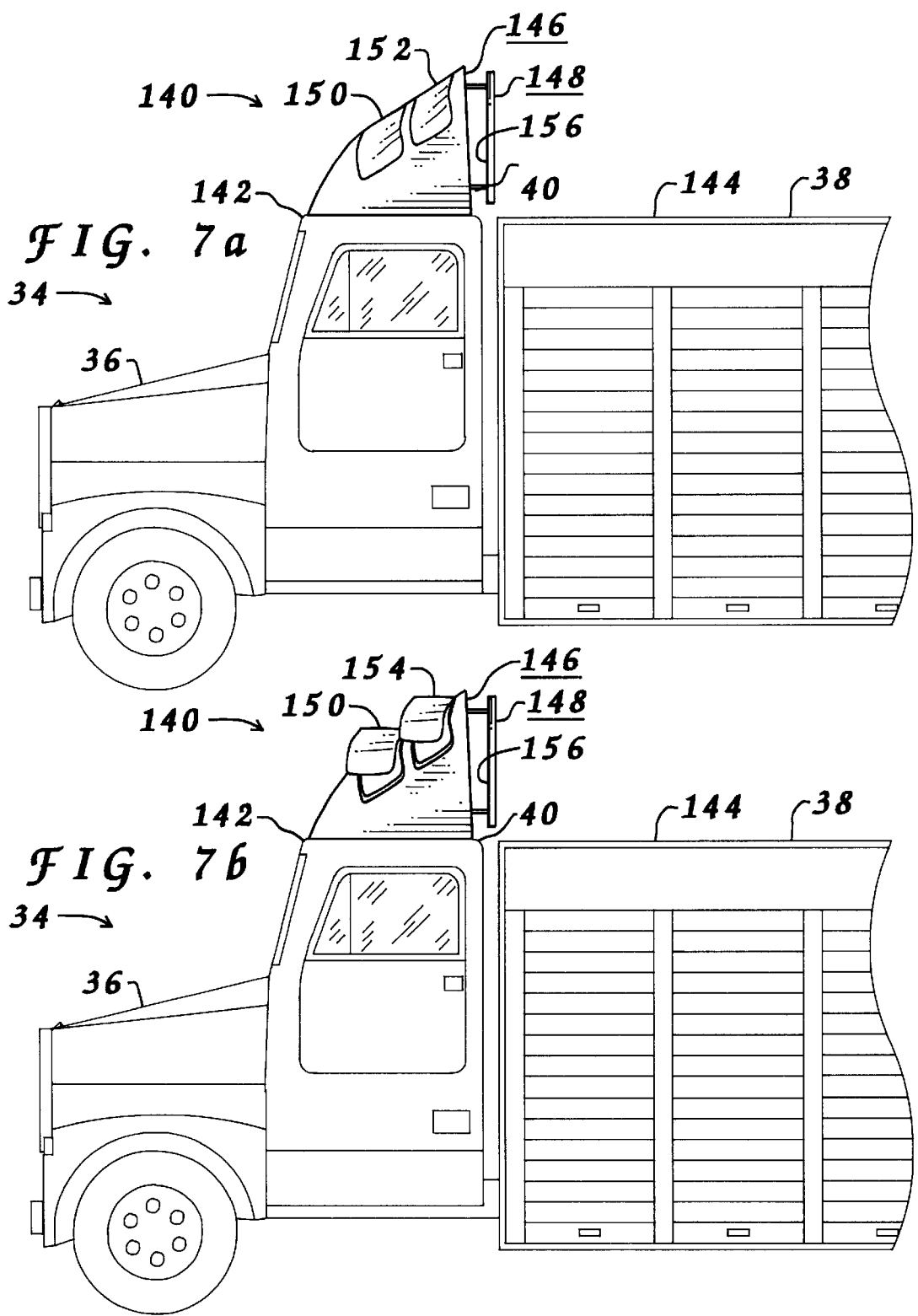

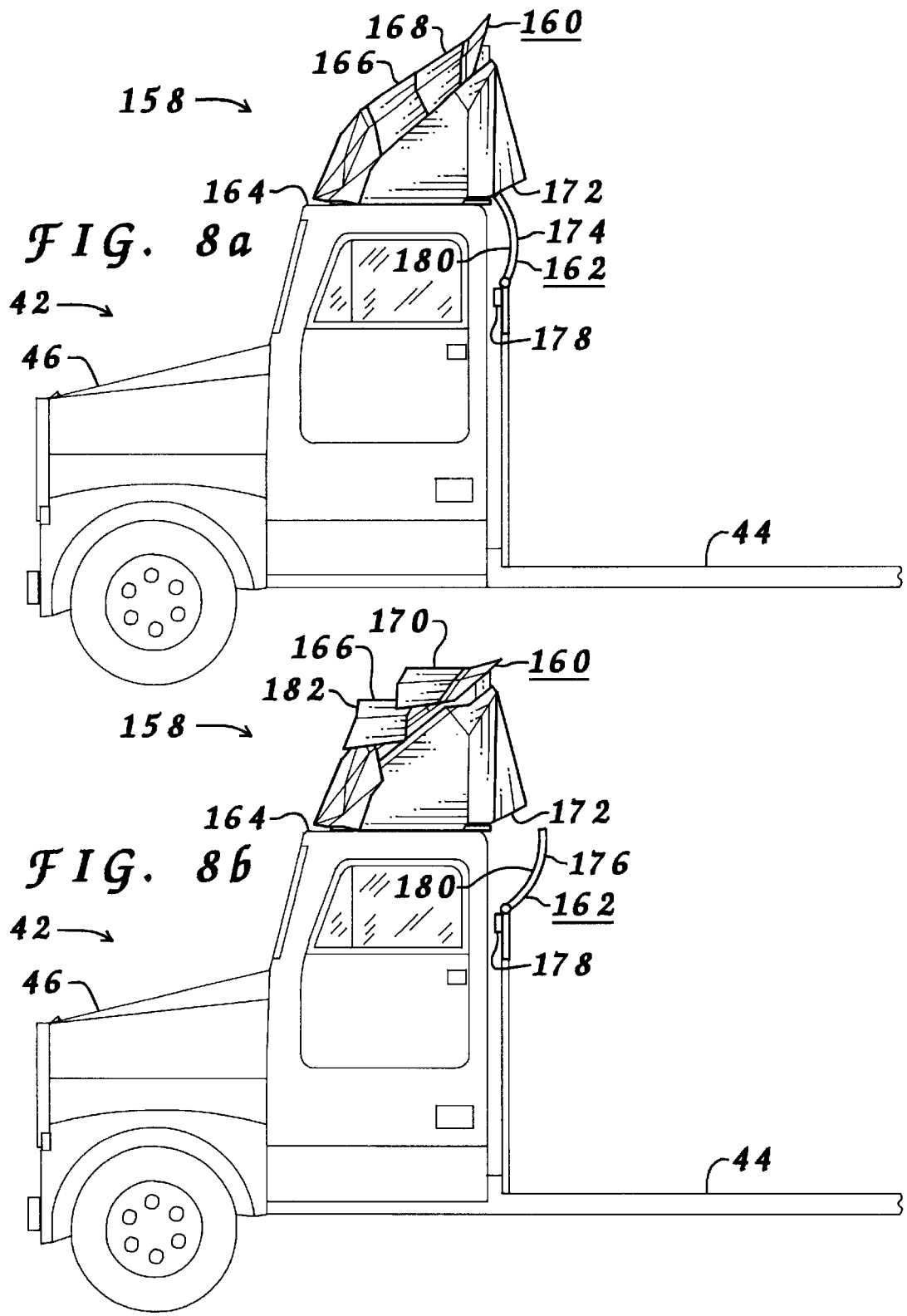

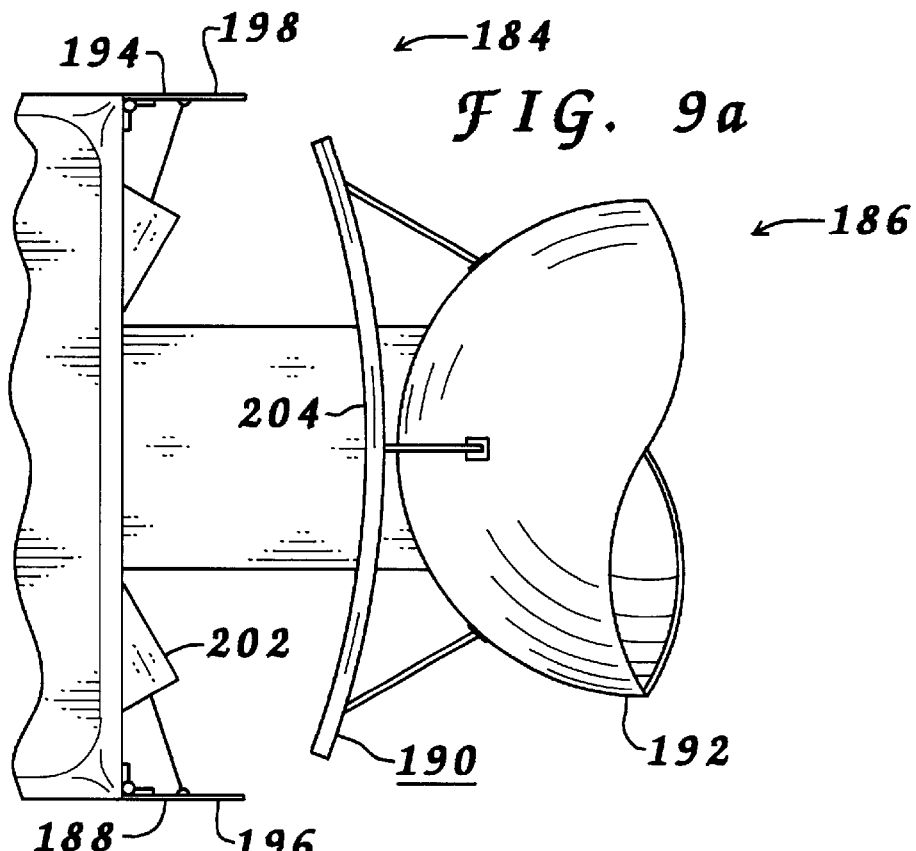
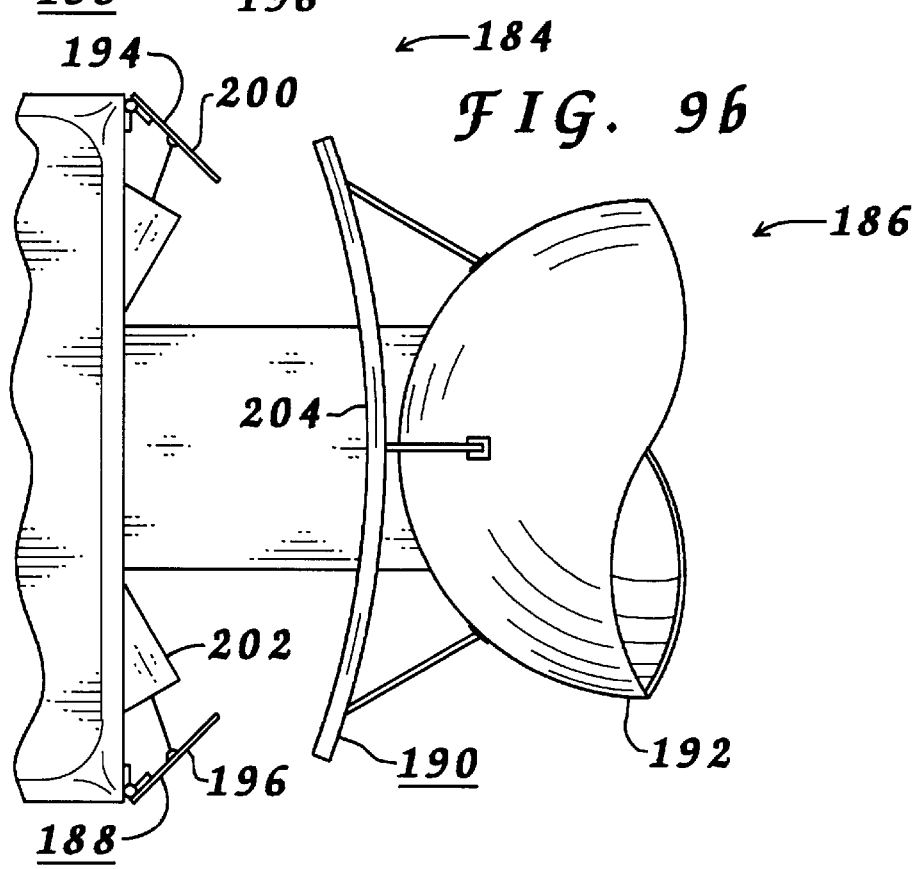

DEVICE TO SELECTIVELY CREATE DRAG ON A TRANSPORT VEHICLE FOR SPEED REDUCTION

CROSS-REFERENCES

This application is a continuation-in-part application of: U.S. Ser. No. 08/873,306, filed Jun. 11, 1997 is now U.S. Pat. No. 5,876,088 and entitled "Fairing Assembly Having Door Openings Therein", currently pending, which is a continuation-in-part application of Ser. No. 08/659,079, filed Jun. 3, 1996 and entitled "Fairing Shell Assembly Having Planar Surfaces Thereon", U.S. Pat. No. 5,653,493, issued Aug. 5, 1997, which is a continuation-in-part application of the following three U.S. Patents: Ser. No. 08/351,800, filed Dec. 8, 1994 and entitled "Auxiliary Braking Panels for a Tractor Trailer Combination", U.S. Pat. No. 5,522,637, issued Jun. 4, 1996, and Ser. No. 08/351,831, filed Dec. 8, 1994 and entitled "Cross Wind Conditioning for a Tractor Trailer Combination", U.S. Pat. No. 5,536,062, issued Jul. 16, 1996, and Ser. No. 08/352,515, filed Dec. 9, 1994 and entitled "Segmented Air Deflector Assembly". U.S. Pat. No. 5,595,419, issued Jan. 21, 1997. All of these applications are incorporated herein by this reference.

BACKGROUND

1. Field of the Invention

Generally, the invention relates to methods, and associated devices, to create a drag effect about a transport vehicle. More specifically, the invention relates to slipstream redirection devices and impingement surfaces which cooperate to create the drag effect.

2. Description of the Prior Art

Numerous attempts have been made to provide for a re-direction of slipstream about a transport vehicle to selectively create a drag effect. Generally, these attempts have attached the slipstream redirection device to a roof area of the truck. This placement provides for slipstream redirection assemblies of the slipstream redirection device to be elevationally above the roof area. Therefore, such devices have relied upon the redirected slipstream to strike a forward face of a trailer of the transport vehicle which extended upward above an upper extent of the roof of the truck. Applicable transport vehicles needed to have a large, generally vertically oriented, flat surface situated on the trailer behind the truck of a height significantly above the height of the roof of the truck. Transport vehicles lacking such high forwardly facing flat surfaces were not subject to inclusion in a group upon which such devices could create the desired drag effect. Examples of such excluded transport vehicles include those having flatbed trailers, those having tanker type trailers, those having a forward flat surface of insufficient height and those where the truck was bobtailing, moving without a trailer attached thereto.

These re-direction attempts have failed to provide inclusion of the above identified excluded group of transport vehicles. As such, it may be appreciated that there continues to be a need for a device which provides for the desired selective creation of drag upon the transport vehicle wherein all type of transport vehicles may be included. The present invention substantially fulfills these needs.

SUMMARY

In view of the foregoing disadvantages inherent in the known types of slipstream redirection devices to selectively create a drag effect upon the transport vehicle, your applicant has devised a method of selectively creating a drag effect upon a truck during a forward advance of the truck along a highway. The method comprises providing a drag creation device further comprising a striking surface device and a slipstream control device. Applicable trucks are of a type used to haul a trailer along the highway. The slipstream control device of the drag creation device is situated on the truck and moveable between a slipstream streamlining orientation and a slipstream redirecting orientation. While in the slipstream streamlining orientation a portion of a slipstream created by the forward advance of the truck is diverted away from the striking surface device of the drag creation device. While in the slipstream redirecting orientation a portion of the slipstream is redirected for impingement of the striking surface device of the drag creation device. This impingement of the striking surface device by the redirected portion of the slipstream creates a drag effect on the truck wherein the truck experiences a resistance to the forward advance.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a selective creation of a drag effect upon a transport vehicle where that transport vehicle does not have an elevated, substantially flat, impingement surface positioned thereon rearward from a forward extent of the transport vehicle and extending substantially above a roof elevation of a truck portion of the transport vehicle.

Other objects include;

a) to provide for a slipstream control device to be positioned on a truck for selective control over a slipstream during movement of the truck along a highway wherein the slipstream control device is moveable between a slipstream streamlining orientation and a slipstream redirecting orientation.

b) to provide for a drag creation device wherein all components thereof are positioned on a truck wherein the creation of drag may occur in the absence of a trailer attached thereto.

c) to provide for a drag creation device comprising a first component group and a second component group and wherein the first component group includes the slipstream control device and is positioned on the truck and the second component group includes the striking surface device and is positioned on a trailer attached to the truck.

d) to provide for a striking surface device of the drag creation device to be positioned on the truck.

e) to provide for the striking surface device of the drag creation device to be positioned on the trailer.

f) to provide for the striking surface device of the drag creation device to be positionally fixed on the transport assembly.

g) to provide for the striking surface device of the drag creation device to be moveable between a free flow configuration and an impingement configuration.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 1 is an elevational side view of a transport vehicle combination with an embodiment of a drag creation device installed thereon.

FIG. 2a is a sectional top plan view of the drag creation device as taken from the section line '2a' shown in FIG. 1 while in a slipstream streamlining orientation and a free flow configuration.

FIG. 2b is a sectional top plan view of the drag creation device depicted in FIG. 2a in a slipstream redirecting orientation and an impingement configuration.

FIG. 3a is a sectional top plan view of a portion of a striking surface device as taken from the section line '3a' shown in FIG. 2a while in the free flow configuration with an uppermost extent cut away.

FIG. 3b is a sectional top plan view of a portion of a striking surface device as taken from the section line '3b' shown in FIG. 2b while in the impingement configuration with the uppermost extent cut away.

FIG. 6a is a sectional top view as taken from the section line '6a' shown in FIG. 5a.

FIG. 7a and FIG. 7b are sectional elevational views of another embodiment of drag creation device in alternative operating positions.

FIG. 8a and FIG. 8b are sectional elevational views of another embodiment of drag creation device in alternative operating positions.

FIG. 9a and FIG. 9b are sectional top plan views of another embodiment of drag creation device in alternative operating positions.

DESCRIPTION

Figure 4A:
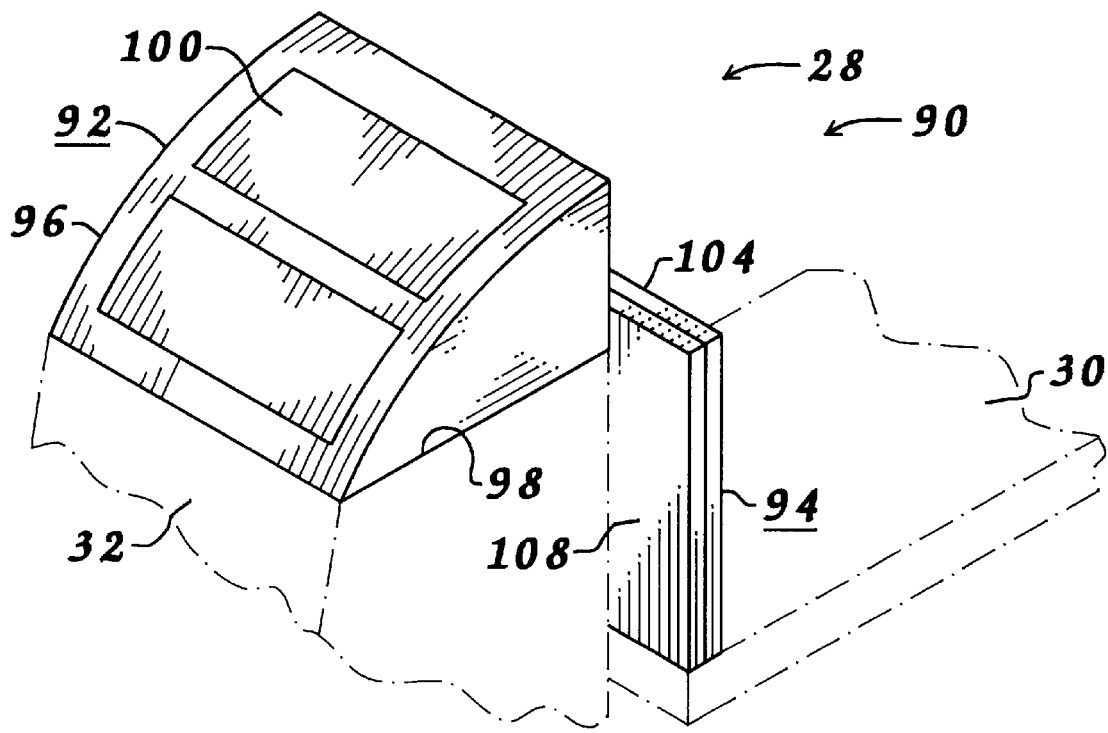
FIG. 4a and FIG. 4b are sectional perspective views of another embodiment of drag creation device in alternative operating positions.

Reference is now made to the drawings where like reference numerals refer to like parts throughout the various views. The term transport assembly as used herein refers either to a truck alone or to a truck and at least one trailer. The term truck as used herein refers to a motor vehicle capable of transporting, directly or indirectly, goods or materials over a highway. The term transport vehicle combination as used herein refers to a combination of the truck and at least one trailer. Applicable trailers under the present invention include those which lack a substantially flat, forwardly facing, surface which extends upward significantly above an elevational height of a roof area of the truck utilized to pull the trailer. These include tanker type trailers, flatbed trailers and trailers having a flat forwardly facing surface situated behind the truck portion of insufficient height to extend substantially above the elevation height of the roof of the truck portion. The term slipstream as used herein refers to that air flow passing a transport vehicle and created by movement of the transport assembly during a forward advance of the transport vehicle along a highway. The term streamlined as used herein refers to configurations relative to the transport assembly which are designed to allow for the slipstream to move therepast without significant resistance. The simplest example of such implementation resides in not having any large impingement surfaces extending generally perpendicularly into the slipstream. When such impingement surfaces do exist, designs may be employed to reduce resistance to passage through the slipstream. Such designs may have forwardly facing surfaces thereon, as exampled by curved, domed or conical surfaces, which allow for efficient passage of the slipstream thereby. Alternatively, such designs may have slipstream redirection devices attached thereabout which divert the slipstream for efficient passage past the forwardly facing surfaces. The term component groups as used herein refers to; 1) a structural assembly, or assemblies, which exerts a diverting control over the slipstream or, 2) to a structural assembly, or assemblies, which provide for impaction of that diverted slipstream to cause the desired drag effect. These structural assemblies may be separate and distinct detached assemblies which are not structurally attached or they may be attached together as a common assembly.

Figure 4B:
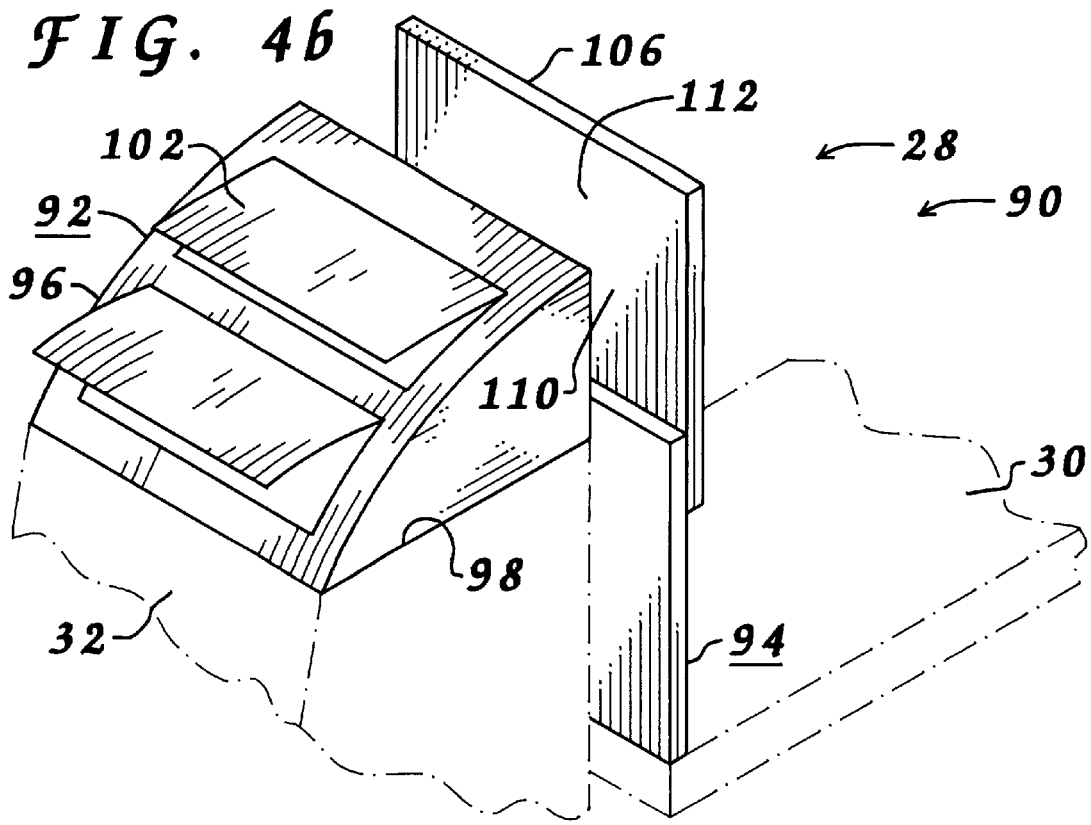
Figure 5A:
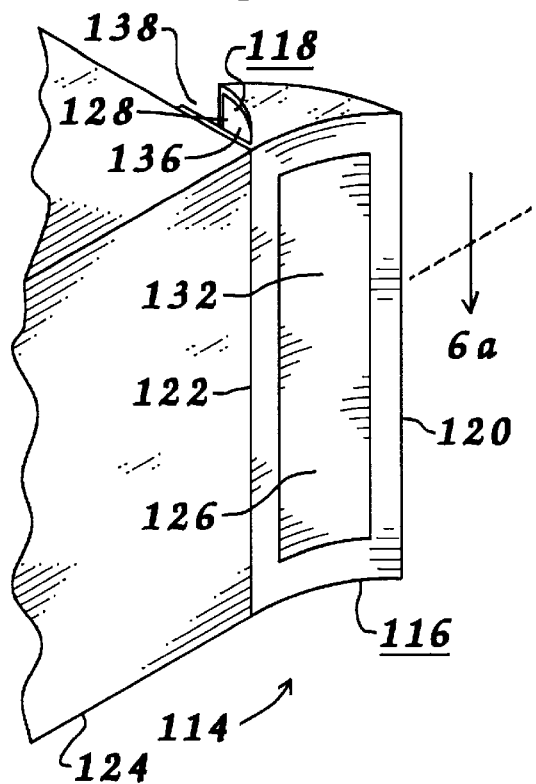
FIG. 5a and FIG. 5b are sectional perspective views of another embodiment of drag creation device in alternative operating positions.
Figure 5B:
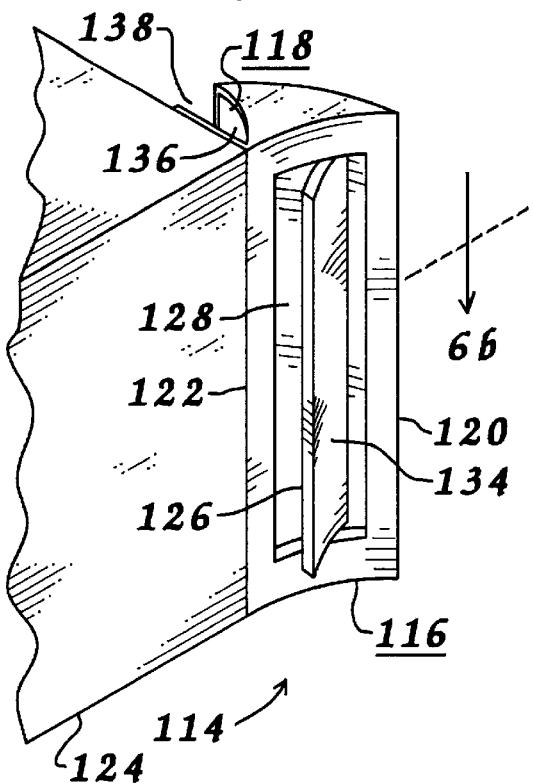
Figure 6A:
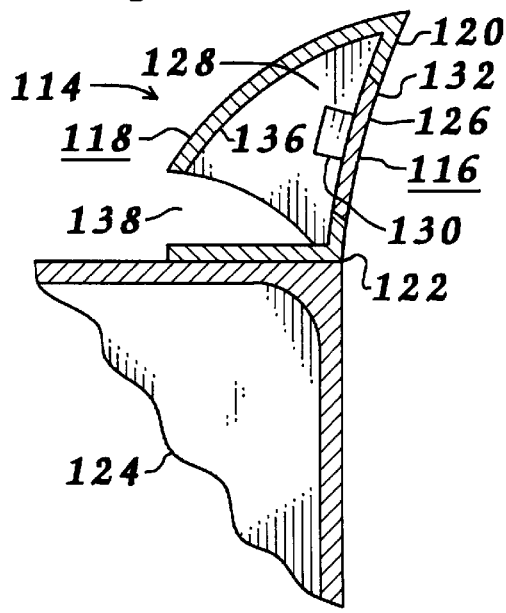
Figure 6B:
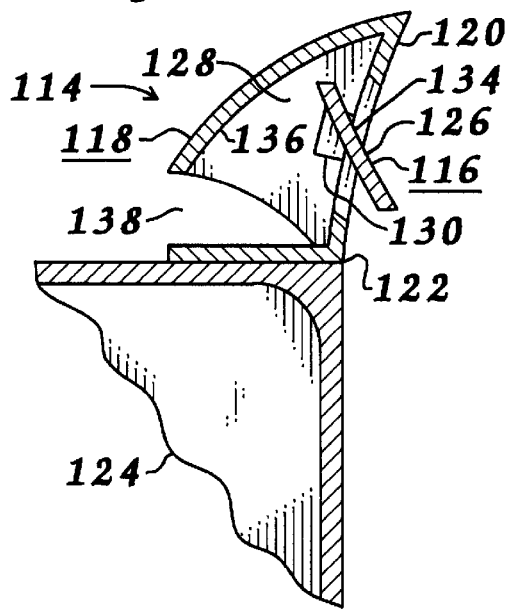
FIG. 6b is a sectional top view as taken from the section line '6b' shown in FIG. 5b.

FIG. 1 depicts a transport vehicle combination 20 comprised of a truck 22 and a trailer 24 as conventionally known in the art. Transport vehicle combinations applicable to the present invention may have additional trailers attached thereto. It is commonly known to provide for trailer 24 to be pivotally attached to truck 22, as depicted in FIG. 1. Alternatively, the truck and the trailer may be rigidly attached together, as depicted in FIG. 7a through FIG. 8b. FIG. 1 depicts transport vehicle combination 20 having a tanker type trailer 26 being pulled by truck 22. Such trailers are conventionally utilized to transport liquids and granulated materials. FIG. 4a and FIG. 4b depict a transport vehicle combination 28 having a flatbed type trailer 30 as would be pivotally attached to a truck portion 32. FIG. 7a and FIG. 7b depict a transport vehicle combination 34 having a truck portion 36 and a closed body type trailer 38. Such trailers, applicable to the present invention, do not extend significantly above a maximum elevational height 40 of truck portion 36. Such trailers are conventionally utilized to transport various goods where frequent stops are required during distribution of the goods. FIG. 8a and FIG. 8b depict a transport vehicle combination 42 having a flatbed type trailer 44 fixedly positioned relative to a truck portion 46. Such flatbed trailers are conventionally utilized to transport various types of materials and equipment. Other applicable trailers under the present invention include automobile carriers. All such transport vehicles, with or without a trailer attached thereto, have a directional orientation, including forwardly and rearwardly, during a forward advance along a highway. Forwardly being toward a front of the vehicle, or an identifiable portion thereof, while rearwardly being toward a rear of the vehicle, or an identifiable portion thereof.

A drag creation device, having features of the present invention, will be comprised of a slipstream control device and a striking surface device. The slipstream control device will be positioned on the truck and will have components which allow transfer of the slipstream control device between a slipstream streamlining orientation and a slipstream redirecting orientation. The striking surface device will be a dedicated component which may be positioned on either the truck or on a trailer being towed by the truck, depending, at least in part, upon the location of the slipstream control device on the truck.

The slipstream streamlining orientation will provide for a streamlining redirection of a portion of the slipstream passing the truck during a forward advance of the truck along a highway. Such redirection will provide for a reduction in resistance to the forward advance of the truck along the highway. The slipstream redirecting orientation will provide for a redirection of a portion of the slipstream passing the truck during the forward advance of the truck along the highway.

The striking surface device will comprise an impingement surface which does not conventionally exist on applicable existing trucks or trailers. The impingement surface of the striking surface device may be positionally fixed at the point of attachment or may have transfer means which allows displacement between a free flow configuration and an impingement configuration. The free flow configuration provides for passage of the slipstream thereby without significant resistance being experienced. The impingement configuration provides for an impingement by a redirected portion of the slipstream to create the desired drag effect. The impingement surface of the striking surface device causes the slipstream which interacts with it to be significantly disturbed producing the desired drag effect.

Various structures may be employed to provide for the transfer of the impingement surface of the striking surface device between the free flow configuration and the impingement configuration. Two examples of such structures include displaceable assemblies and rotational assemblies. Examples of displaceable assemblies include vertically or horizontally displaceable panels which may be extended and retracted to respectively increase or decrease an exposed surface which acts as the impingement surface. Alternatively, such displacement may provide for exposure and concealment of the impingement surface relative to a path of the redirected slipstream. Similarly, the displacement assembly may be displaced to exposed or conceal openings within the impingement surface. Examples of rotational assemblies include a plurality of elongated panels which may be displaced to expose openings between adjacent panels or displaced to close the respective openings between adjacent panels. Examples of such assemblies include louvers.

The slipstream control device may comprise a single slipstream diversion unit or may comprise opposing slipstream diversion units. When the slipstream control device is a single slipstream diversion unit, preferably the unit is positioned on the roof of the truck. When the slipstream control device is formed of opposing slipstream diversion units preferably such units are symmetrically placed on opposing sides of the truck. Such placement may be in the close proximity to an upper extent of the truck, or at any select location in close proximity to opposing rearward edges of the truck.

The slipstream control device will have at least one movable part which provides for a select diversion of a portion of the slipstream moving therepast. The movable part may selectively allow passage of the slipstream through a portal, through a ducting system or along an outer or inner surface of a panel. Various control means may be employed to exercise control over the movable part, or parts, of the slipstream control device. Numerous configurations of structures may be employed to provide the desired transfer.

FIG. 1 through FIG. 3b depict a drag creation device 48, or portions thereof, attached to transport vehicle combination 20. Drag creation device 48 comprises a slipstream control device 50 and a striking surface device 52. Transport vehicle combination 20 comprises truck 22 and trailer 24. In this embodiment, slipstream control device 50 is positioned in close proximity to a rearward extent 54 of a truck cab 56 on truck 22 while striking surface device 52 is positioned in close proximity to a forward extent 58 of a container body 60 of trailer 24.

Slipstream control device 50 is transferable between a slipstream streamlining orientation 62, see FIG. 2a, and a slipstream redirecting orientation 64, see FIG. 2b. While in slipstream streamlining orientation 62 the slipstream may pass slipstream control device 50 with minimal disturbance. While in slipstream redirecting orientation 64 a portion of the slipstream may be redirected inward immediately behind truck cab 56. The art is rich which structures, and associative methods, of selectively displacing one component relative to another component and any suitable structure selected from these structures may be utilized to provide for the desired transfer of the various displaceable components of the present invention. This includes the displacement of slipstream control device 50 between slipstream streamlining orientation 62 and slipstream redirecting orientation 64. Preferably, applicable transfer means will be powered by either pneumatic power or electrical power.

Slipstream control device 50 further comprises a first assembly 66 and a second assembly 68, see FIG. 2a and FIG. 2b. Each assembly 66 and 68 further comprise a side extender panel 70, a linking member 72 and a pneumatic line 74. Pneumatic line 74 powers structures of linking member 72, as conventionally known in the art, to cause the desired movement of side extender panel 70 between slipstream streamlining orientation 62 and slipstream redirecting orientation 64.

Striking surface device 52 is transferable between a free flow configuration 76, see FIG. 2a and FIG. 3a, and an impingement configuration 78, see FIG. 2b and FIG. 3b. While in free flow configuration 76 slipstream may pass striking surface device 52 with minimal resistance. While in impingement configuration 78 slipstream is substantially blocked from passing an impingement surface 80, see FIG. 3b, and must move around a perimeter 82 which completely surrounds impingement surface 80. Any suitable structure may be utilized to provide for the desired transfer of striking surface device 52 between free flow configuration 76 and impingement configuration 78.

Preferably, applicable transfer means will be powered by either pneumatic power or electrical power. FIG. 2a and FIG. 2b depict a pneumatic drive 84 positioned at a lower extent of striking surface device 52. Pneumatic drive 84 receive pneumatic power via a pneumatic line 85. Pneumatic drive 84 powers movement of a coupling member 86, see FIG. 3a and FIG. 3b, which operate upon a plurality of louvers 88. Louvers 88 cooperate to form impingement surface 80 while striking surface device 52 is in impingement configuration 78.

FIG. 4a and FIG. 4b depict a drag creation device 90 attached to transport vehicle combination 28. Drag creation device 90 comprises a slipstream control device 92 and a striking surface device 94. Transport vehicle combination 28 comprises truck portion 32 and flatbed type trailer 30. In this embodiment, slipstream control device 92 is positioned on a fairing assembly 96 attached to a roof 98 of truck portion 32 while striking surface device 94 is positioned on flatbed type trailer 30. Slipstream control device 92 is transferable between a slipstream streamlining orientation 100, see FIG. 4a, and a slipstream redirecting orientation 102, see FIG. 4b. While in slipstream streamlining orientation 100 slipstream control device 92 provides for a streamlining redirection of slipstream created during a forward advance of transport vehicle combination 28. While in slipstream redirecting orientation 102 slipstream control device 92 provides for a redirection of the slipstream during the forward advance of transport vehicle combination 28. Striking surface device 94 is vertically displaceable between a free flow configuration 104, see FIG. 4a, and an impingement configuration 106, see FIG. 4b. While in free flow configuration 104 striking surface device 94 presents a reduced exposed surface area 108 which is positioned substantially out of a slipstream created by forward advance of transport vehicle combination 28. While in impingement configuration 106 striking surface device 94 presents an increased exposed surface area 110 which forms an impingement surface 112 which is positioned substantially in the redirected slipstream created by slipstream control device 92 while in slipstream redirecting orientation 102, see FIG. 4b.

FIG. 5a through FIG. 6b depict a drag creation device 114 which may create the desired drag effect without regard for whether or not a trailer is present. Drag creation device 114 comprises a slipstream control device 116 and a striking surface device 118 which are mutually contained within a housing 120. Drag creation device 114 is attached to a rearward edge 122 of a truck 124. A second drag creation device 114, not shown, would be positioned on the opposing side of truck 124.

In this embodiment, a portion of the slipstream is redirected by a displaceable panel 126 of slipstream control device 116 into an interior 128 of housing 120. A drive assembly 130 acts to power movement of displaceable panel 126 between a slipstream streamlining orientation 132, see FIG. 5a and FIG. 6a, and a slipstream redirecting orientation 134, see FIG. 5b and FIG. 6b. Once within interior 128 the redirected slipstream would impinge an impingement surface 136 of striking surface device 118. In this embodiment, impingement surface 136 is fixedly positioned and does not move. The redirected slipstream would then exit interior 128 through an exit slot 138. Drag creation device 114 may be used to create the desired drag effect without regard for whether or not truck 124 is pulling a trailer.

FIG. 7a and FIG. 7b depict a drag creation device 140 which may create the desired drag effect without regard for whether or not a trailer is present. In the example depicted, closed body type trailer 38 is present but does not contribute significantly to the creation of drag. Drag creation device 140 is attached to a roof 142 of truck portion 36. Closed body type trailer 38 has a maximum elevational height 144 which is not significantly higher than maximum elevation height 40 of truck portion 36. Drag creation device 140 comprises a slipstream control device 146 and a striking surface device 148. Striking surface device 148 is completely behind slipstream control device 146. Slipstream control device 146 has multiple displaceable panels 150 which may be transferred between a closed position 152, see FIG. 7a, and an open position 154, see FIG. 7b. While in closed position 152 the slipstream is diverted away from striking surface device 148. While in open position 154 the slipstream is redirected to impinge an impingement surface 156 of striking surface device 148. Such impingement creating the desired drag effect upon transport vehicle combination 34.

FIG. 8a and FIG. 8b depict a drag creation device 158 which may create the desired drag effect. Drag creation device 158 comprises a slipstream control device 160 and a striking surface device 162. Drag creation device 158 is attached to a roof 164 of truck portion 46. Striking surface device 162 is completely behind and below slipstream control device 160. Slipstream control device 160 has multiple displaceable panels 166 which may be transferred between a closed position 168, see FIG. 8a, and an open position 170, see FIG. 8b. While in closed position 168 the slipstream is diverted away from striking surface device 162. While in open position 170 the slipstream is redirected downward out of a rearward exit 172 of slipstream control device 160. Striking surface device 162 is transferable between a free flow configuration 174, see FIG. 8a, and an impingement configuration 176, see FIG. 8b. A control assembly 178 causes striking surface device 162 to be transferred between free flow configuration 174 and impingement configuration 176. Striking surface device 162 has an impingement surface 180 positioned thereon. While slipstream control device 160 is in a slipstream redirecting orientation 182 and striking surface device 162 is in impingement configuration 176 the redirected slipstream impinges impingement surface 180 of striking surface device 162. Such impingement creating the desired drag effect on transport vehicle combination 42.

FIG. 9a and FIG. 9b depict a drag creation device 184 attached to a transport vehicle combination 186 which may create the desired drag effect. Drag creation device 184 comprises a slipstream control device 188 and a striking surface device 190. In this embodiment, striking surface device 190 is positionally fixed on a trailer 192. Slipstream control device 188 comprises a first side extender panel 194 and a second side extender panel 196 which are each transferable between a slipstream streamlining orientation 198, see FIG. 9a, and a slipstream redirecting orientation 200, see FIG. 9b. Such transfer being controlled by a control device 202. While in slipstream streamlining orientation 198 the slipstream is diverted away from striking surface device 190. While in slipstream redirecting orientation 200 a portion of the slipstream is redirected to impinge an impingement surface 204 of striking surface device 190. Such impingement creating the desired drag effect upon transport vehicle combination 186.

As disclosed above, a specific embodiment of a drag creation device may be employed to provide for selective creation of a drag effect upon a transport assembly. Without regard for the specific embodiment selected, each such device will have a slipstream control device and a striking surface device. The following example details certain events which will produce select results which produce the desired drag effect. The following example utilize a striking surface device which may be transferred between a free flow configuration and an impingement configuration.

Figure 10:
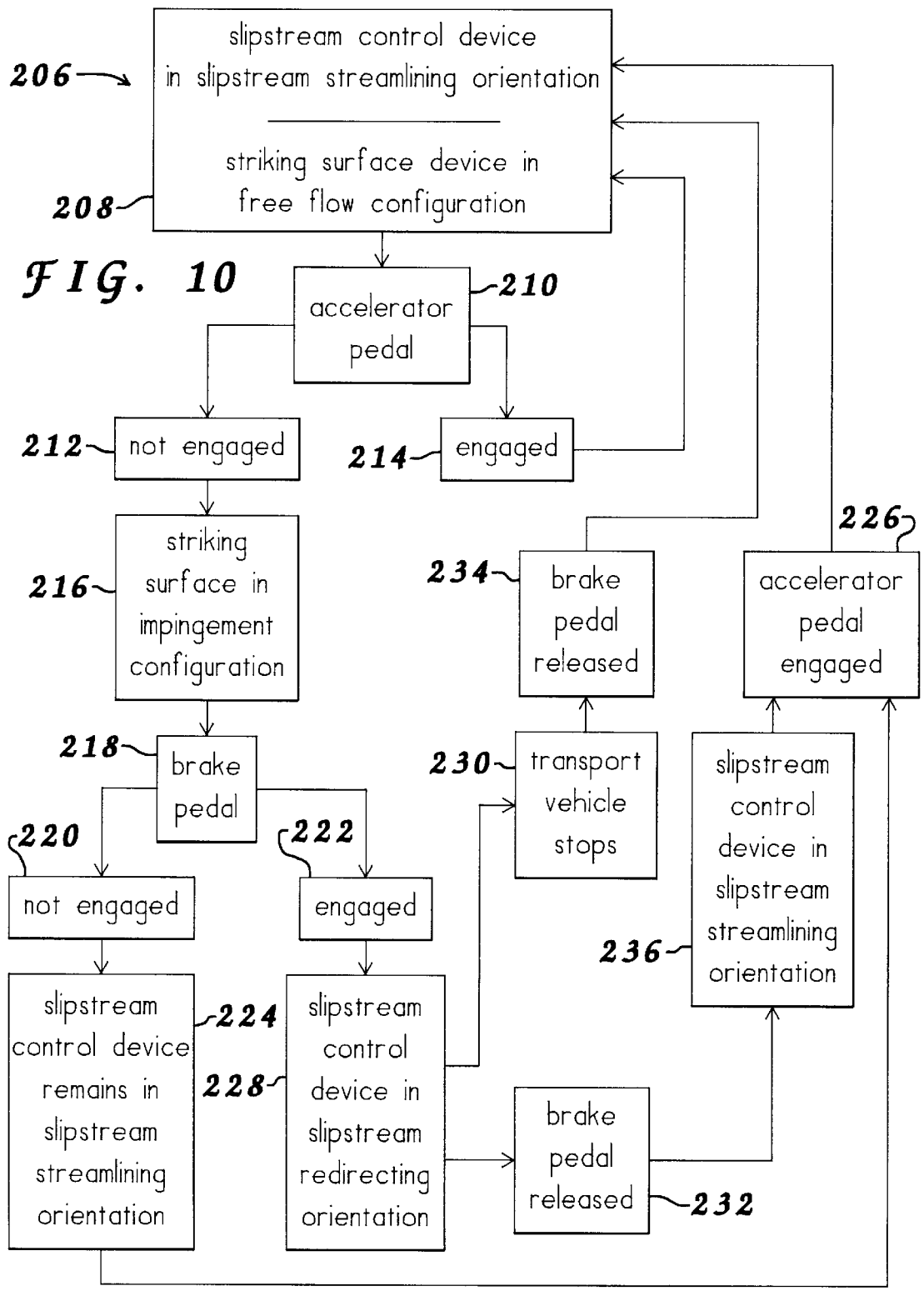
FIG. 10 is a flow chart of various actions of an embodiment of an operational system.

FIG. 10 depicts operation of a control system 206 in a preferred embodiment of the invention. Control system 206 comprises a drag creation device having a slipstream control device and a striking surface device as more particularly disclosed elsewhere herein. The transport assembly upon which the drag creation device is installed will have an accelerator pedal and a brake pedal as conventionally known in the art.

'Slipstream control device in slipstream streamlining orientation—striking surface device in free flow configuration' 208 depicts a beginning point of control system 206. 'Accelerator pedal' 210 will be either 'Not engaged' 212 or 'Engaged' 214. When 'Engaged' 214 occurs at this point control system 206 leaves 'Slipstream control device in slipstream streamlining orientation—striking surface device in free flow configuration' 208. When 'Not engaged' 212 occurs at this point 'Striking surface in impingement configuration' 216 occurs. At this point 'Brake pedal' 218 will be either 'Not engaged' 220 or 'Engaged' 222. When 'Not engaged' 220 occurs at this point 'Slipstream control device remains in slipstream streamlining orientation' 224 occurs. From this point 'Accelerator pedal engaged' 226 occurs. From this point control system 206 returns to 'Slipstream control device in slipstream streamlining orientation—striking surface device in free flow configuration' 208. When 'Engaged' 222 occurs 'Slipstream control device in slipstream redirecting orientation' 228 occurs. At this point the slipstream is redirected to impinge impingement surface and the desired drag is created. At this point either 'Transport vehicle stops' 230 or 'Brake pedal released' 232 occurs. When 'Transport vehicle stops' 230 occurs 'Brake pedal released' 234 occurs and control system 206 returns to 'Slipstream control device in slipstream streamlining orientation striking surface device in free flow configuration' 208. When 'Brake pedal released' 232 occurs (in the absence of 'Transport vehicle stops' 230) 'Slipstream control device in slipstream streamlining orientation' 236 occurs. At this point 'Accelerator pedal engaged' 226 occurs and control system 206 returns to 'Slipstream control device in slipstream streamlining orientation—striking surface device in free flow configuration' 208.

The present invention may be employed whenever it is desired to create the drag effect upon the transport vehicle. A particularly desirable utilization of the present invention involves deployment for transport vehicles which routinely operate on down grade highways. In these conditions it is desirable to provide for the creation of drag during coasting as exampled by the accelerator pedal not being engage. One embodiment involves use of a leveling switch which may determine a downward angle of the transport vehicle and transfer the slipstream control device to the slipstream redirecting orientation when a predetermined downward angle is exceeded. Additionally, a manual override switch may be installed in any of the deployments to allow for the operator to selectively activate the system or to selectively disable the system.

Anti-collision warning systems are conventionally known in the art to alert the operator that the transport vehicle is closing upon a detached object in the path of the transport vehicle. A particularly expedient usage of the present invention involves deployment wherein the drag creation device moves to the slipstream redirection orientation contemporaneously with activation of conventionally known operator notification means, as exampled by an audio alert. This provides for the drag creation device to cause the transport vehicle to begin to slow simultaneously with the initial indication of a potential collision. This configuration provides for a safer reaction to the potentially dangerous condition detected by the anti-collision warning system.

Alternatively, a vibration detection system may be developed which detects sudden vibration about the transport vehicle, which would be indicative of the transport vehicle running off the roadway or a mechanical failure such as a deflated tire. Such a system could then cause the drag creation device to begin to slow the transport vehicle.

In any of the various embodiment possible for drag creation device having features of the present invention it is possible to provide a linkage to the gear that the transport vehicle is operating in, to the operating speed of the transport vehicle, or to both. Such linkage would preferably provide for the system to create the desired drag effect only while the transport vehicle is operating in a high gear range or when the transport vehicle is operating at intermediate or high speeds. Such a deployment limiting system would be particularly expedient where the slipstream control device is positioned on, or in close proximity to, side extenders where such components may engage the trailer during tight turning of the transport vehicle while in either operational position.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A drag creation device to selectively provide for a creation of a drag effect on a truck cab during a forward advance of the truck along a highway, the truck of a type used to haul a trailer along the highway, the drag creation device comprising:
   a) a slipstream control device situated on the truck cab;
   b) a striking surface device attached to the slipstream control device and spaced rearwardly therefrom to provide upper, lower, and side exit areas;
   c) control means to provide for placing the slipstream control device in:
      1) a slipstream streamlining orientation to provide for a streamlining redirection of a portion of a slipstream, the streamlining redirection to provide for a diversion of the portion of the slipstream away from the striking surface device during the forward advance of the truck, the slipstream created by the forward advance of the truck; and
      2) a slipstream redirecting orientation to provide for a redirection of the portion of the slipstream, the redirection to provide for an impingement of the striking surface device by the portion of the slipstream, the impingement to provide for the creation of the drag effect on the truck wherein the truck experiences a resistance to the forward advance.

2. The drag creation device defined in claim 1 wherein the truck further comprises opposing side extenders attached to the truck and wherein the slipstream control device further comprises opposing control assemblies with each respective control assembly attached to a respective side extender.

3. The drag creation device defined in claim 2 wherein the striking surface device further comprises opposing striking surface device assemblies and wherein each of the respective striking surface device assembly is attached to one of the respective side extenders.

4. The drag creation device defined in claim 2 wherein the striking surface device is situated on the truck behind the opposing side extenders.

5. The drag creation device defined in claim 1 wherein the slipstream control device further comprises a louvered fairing having at least one moveable door panel therein, the louvered fairing further situated on a roof of the truck.

6. The drag creation device defined in claim 5 wherein the striking surface device is situated on the louvered fairing behind the moveable door panel.

7. The drag creation device defined in claim 5 wherein the striking surface device is situated on the roof of the truck behind the louvered fairing.

8. A drag creation device to selectively provide for a creation of a drag effect on a transport vehicle combination during a forward advance of the transport vehicle combination along a highway, the transport vehicle combination having a truck, a trailer and a directional orientation based on the forward advance along the highway, the trailer having a streamlined front, the drag creation device comprising:
   a) a movable striking surface device attached to the trailer forwardly from the streamlined front of the trailer, the striking surface device having an impingement surface extending horizontally and vertically and movable between impingement and free flow configurations;
   b) a slipstream control device situated on the truck;
   c) control means to provide for placing the slipstream control device in:
      1) a slipstream streamlining orientation to provide for a streamlining redirection of a portion of a slipstream, the streamlining redirection to provide for a diversion of the portion of the slipstream away from the impingement surface of the striking surface device during the forward advance of the transport vehicle combination, the slipstream created by the forward advance of the transport vehicle combination; and
      2) a slipstream redirecting orientation to provide for a redirection of the portion of the slipstream, the redirection to provide for an impingement of the impingement surface of the striking surface device by the portion of the slipstream, the impingement to provide for the creation of the drag effect on the transport vehicle combination wherein the transport vehicle combination experiences a resistance to the forward advance.

9. The drag creation device defined in claim 8 wherein the truck further comprises opposing side extenders attached to the truck and wherein the slipstream control device further comprises opposing control assemblies with each respective control assembly attached to a respective side extender.

10. The drag creation device defined in claim 8 wherein the striking surface device further comprises a fixed positional attachment to the trailer.

11. The drag creation device defined in claim 8 wherein the striking surface device further comprises transfer means to provide for moving the striking surface device between:
   a) said free flow configuration to provide for a passage of air thereby with a minimal resistance to the passage;
   b) said impingement configuration to provide for an exposure of the impingement surface.

12. The drag creation device defined in claim 11 wherein the striking surface device further comprises a plurality of louvers, each louver moveable by the transfer means.

13. The drag creation device defined in claim 8 wherein the slipstream control device further comprises a louvered fairing having at least one moveable door panel therein, the louvered fairing further situated on a roof of the truck.

14. A drag creation device to selectively provide for a creation of a drag effect on a transport vehicle combination during a forward advance of the transport vehicle combination along a highway, the transport vehicle combination having a truck, a trailer and a directional orientation based on the forward advance along the highway, the trailer having a streamlined front, the drag creation device comprising:
   a) a slipstream control device situated on the truck;
   b) slipstream control device deployment means to provide for moving the slipstream control device between:
      1) a slipstream streamlining orientation to provide for a streamlining redirection of a portion of a slipstream, the streamlining redirection to provide for a diversion of the portion of the slipstream away from the trailer during the forward advance of the transport vehicle combination, the slipstream created by the forward advance of the transport vehicle combination;
      2) a slipstream redirecting orientation to provide for a redirection of the portion of the slipstream, the redirection to provide for a diversion of the portion of the slipstream toward the trailer;
   c) a striking surface device attached to the trailer forwardly from the streamlined front of the trailer;
   d) striking surface device control means to provide for moving the striking surface device between:
      1) a free flow configuration to provide for a passage of air thereby with a minimal resistance to the passage;
      2) an impingement configuration to provide for an exposure of an impingement surface, the impingement surface extending horizontally and vertically, wherein the redirection of the portion of the slipstream by the slipstream control device while in the slipstream redirecting orientation causes the portion of the slipstream to impinge the impingement surface of the striking surface device while in the impingement configuration for the creation of the drag effect on the transport vehicle combination which experiences a resistance to the forward advance.

15. The drag creation device defined in claim 14 wherein the truck further comprises opposing side extenders attached to the truck and wherein the slipstream control device further comprises opposing control assemblies with each respective control assembly attached to a respective side extender.

16. The drag creation device defined in claim 14 wherein the slipstream control device further comprises a louvered fairing having at least one moveable door panel therein, the louvered fairing further situated on a roof of the truck.

17. The drag creation device defined in claim 14 wherein the striking surface device further comprises a plurality of louvers, each louver controlled by transfer means to provide for movement between the free flow configuration and the impingement configuration.

18. The drag creation device defined in claim 14 wherein the truck further comprises an accelerator pedal and a brake pedal and wherein the slipstream control device is in the slipstream streamlining orientation while a pressure is applied to the accelerator pedal and wherein the striking surface device is in the impingement configuration while a pressure is applied to the brake pedal.

* * * * *